Jan. 28, 1941.   G. McCONNELL ET AL   2,230,001
FLOODING PROCESS FOR RECOVERING OILS
Filed April 14, 1939
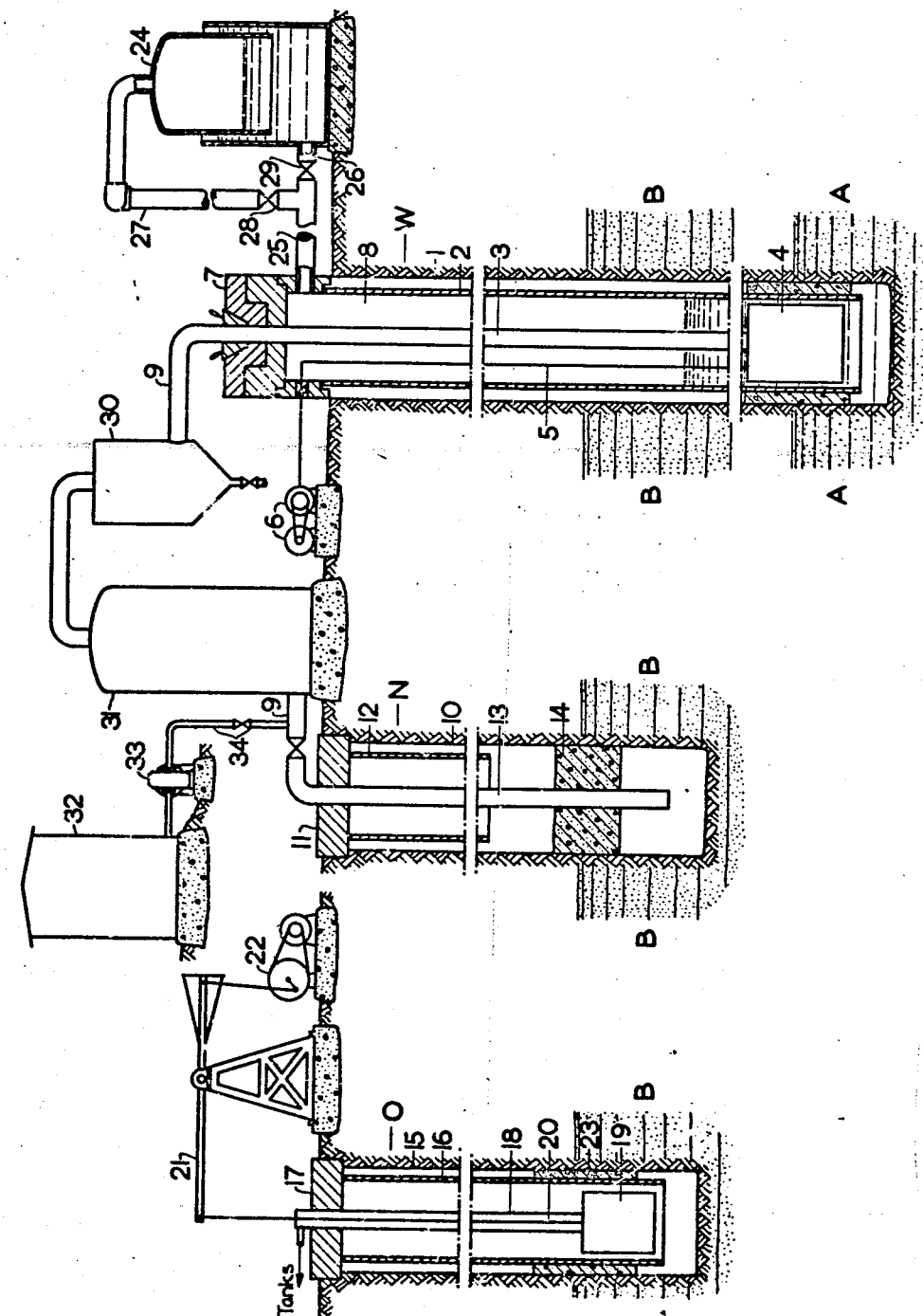
Inventors: Glenver McConnell
Horace V. Steadman
By their Attorney:

Patented Jan. 28, 1941

2,230,001

UNITED STATES PATENT OFFICE 2,230,001

FLOODING PROCESS FOR RECOVERING OILS

Glenver McConnell and Horace Vivian Steadman, Tulsa, Okla., assignors to Shell Development Company, San Francisco, Calif., a corporation of Delaware Application April 14, 1939, Serial No. 267,828

2 Claims. (Cl. 166—21)

This invention pertains to secondary recovery of oil from oil bearing formations by flooding and relates particularly to a method whereby underground water from water-bearing strata may be delivered for flooding purposes to oil-bearing strata, located either at a higher or lower level, by means of a closed system effectively precluding contact of said water with the oxygen of the atmosphere.

The problem of supplying sufficient amounts of water for recovering oil from depleted sands by flooding is commonly solved by forcing water obtained from water layers into the depleted oil sands. Such procedure, however, involves several disadvantages. Thus, the salts and gases normally dissolved in formation waters become oxidized by contact with atmospheric air, for example, in storage or surge tanks, whereby insoluble precipitates are formed which may plug the formation being flooded and prevent or decrease the expected secondary recovery of oil. Thus, for example, hydrogen sulphide may be oxidized to solid sulphur or sulphate ions which may enter into precipitate-forming combinations with other ions. Likewise, dissolved iron may form upon oxidation a gelatinous precipitate of iron oxide which is also capable of plugging the pores of the oil sands.

Furthermore, the release of pressure on formation waters occurring upon contact with the atmosphere permits an evolution of the gases dissolved in said waters under pressure which causes a displacement in the gas-dissolved salt equilibrium, and results in a further precipitation of salts.

Finally, formation waters which have been contacted with atmospheric air have a distinctly increased corrosive action on the metallic equipment of the wells, the losses due to corrosion further increasing the cost of the flooding operations.

It is therefore customary to subject formation waters intended for use in flooding to a treatment adapted to remove such precipitates or any suspended material that may be present.

This treatment usually consists of one or more of the following steps or combinations thereof: aerating the flooding water to oxidize dissolved iron salts to iron oxide, and filtering out the precipitate; aerating said water to remove hydrogen sulfide and carbon dioxide, followed by filtration to separate calcium carbonate which is precipitated due to displacement of the bicarbonate-carbonate equilibrium $$(Ca(HCO_3)_2 \rightleftharpoons CaCO_3 + H_2O + CO_2);$$

stabilizing this equilibrium by adding alkali, carbon dioxide or acid or by percolating through marble chips; removing hydrogen sulphide from the water by contacting it with scrap iron; etc.

Due to the very close chemical control and elaborate equipment necessary for treating flooding water, these processes are expensive, and therefore many formations containing relatively small amounts of recoverable oil cannot be profitably produced by flooding. Furthermore, by aerating the water by such processes the dissolved oxygen content is increased and its corrosive action on metal equipment is aggravated. Also, this oxygen in the flooding water may react with salts and gases dissolved in the connate water of the depleted oil sand to form insoluble precipitates.

It is therefore an object of this invention to provide a method which eliminates the necessity of elaborate and costly treatments of water used for flooding, said method comprising the step of conducting flooding water from water strata to said depleted formations by means of a closed system to prevent contact of the water with the oxygen of the air.

It is another object to provide a method for the above treatment comprising the steps of conducting flooding water from water layers to depleted oil strata by means of a closed system while maintaining the pressure of the flooding water throughout the closed system at a pressure higher than will permit dissolved gases to be evolved from said water, whereby elaborate and expensive treatments as well as water repressuring are avoided.

The present invention will be more clearly understood from the following description taken in reference to the attached drawing, in which:

The single figure is a diagrammatic cross-sectional view of an oil field and wells therein, showing a water well, an injection well, an oil well, and equipment for carrying out the present invention.

Referring to the drawing, a water well, W, comprises a borehole 1, penetrating into the water stratum A, a casing 2, a tubing or pipe 3, and a pump such, for example, as an electrically driven submersible pump 4. Current may be supplied to the pump 4 by means of an insulated electric cable 5 from a motor generator 6 or some other suitable source of energy. The tubing 3, submersible pump 4, and electric cable 5 are supported by a casing head 7, which is suitably sealed to prevent air from entering the annular space 8 between the casing 2, and the tubing 3. The tubing 3, extending from the well is connected to the water distributing system 9, and auxiliary equipment.

An injection well, N, comprises a borehole 10, penetrating into a depleted oil sand B, a casing head 11, a casing 12, and a tubing 13, connected to the water distributing system, and extended

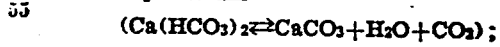

through a packer or cement type seal 14 to a position adjacent the oil sand B.

An oil well, or wells, O, may comprise a borehole 15 penetrating into the oil sand B, a casing 16, and a casing head 17 supporting tubing 18, having a deep well pump 19 attached to the lower end. A sucker rod 20 passes up through the tubing 18 to a rocker arm 21, and motor equipment 22. A cement type seal 23 is placed between the borehole 15 and casing 16 to seal off the oil stratum from layers above it.

To prevent air from coming into contact with the water in the water well, the annular space 8 above the water level is filled with a sealing medium, such as an inert gas or liquid or a combination of both.

Although any desired system may be used to supply the desired sealing gas or liquid, a preferred system, as shown on the drawing, comprises a chamber 24, having a variable volume, such as in a gas-holder or any other equivalent of a floatable bell jar. The annular space 8 between the casing and the tubing is maintained full at all times by automatic passage of the inert sealing medium by means of pipes 25, 26 and 27 and valves 28 and 29 to and from the chamber 24 as the water level rises or falls in the well. When using an inert gas, such as nitrogen or casing-head gas, as the sealing medium, valve 28 is opened and valve 29 is closed. When using an inert liquid, such as oil, valve 28 is closed and valve 29 is opened. In this manner, water may be removed from the water layer A and forced into the oil layer B at its original or higher pressure, or, if desired, without said pressure being allowed to decrease below a predetermined value, such, for example, as a value at which a significant evolution of $CO_2$ would begin, and which is usually a function of the prevailing formation pressure.

In carrying out the process of the invention, water is withdrawn from the water stratum by means of pump 4 and discharges up through tubing 3 into a simple separating system to remove any solid particles, such as sand, which may be carried up from the water layer by the water. The separating system may consist, as shown, of a cyclone type separator 30 and a tank filter 31 in series, or may be any other suitable air-tight device or devices for removing solid particles, or may be omitted entirely if the water issuing from the water well is sufficiently free from solid particles.

From the separating system the water passes into a distributing system 9, comprising a pipe or line, as shown, or several pipes or lines, in a field operation where several injection wells utilize one water supply well.

In some cases, such as for example, when the flooding water contains in solution a gas or a salt which, by reaction with another gas or salt dissolved in the connate water present in the oil layer, may form a precipitate capable of plugging the oil layer, a simple chemical treatment may be used in connection with the present system to prevent the formation of such precipitate. For example, if the flooding water contains about 109 p. p. m. dissolved hydrogen sulfide, while the connate water of the oil layer contains about 44 p. p. m. soluble iron salts as ferrous iron, the precipitation of the insoluble iron sulfide can be prevented by maintaining the injected water at an acid pH of from 42 to 4.6, by introducing, for instance, hydrochloric acid into the water distribution system. It is obvious from a consideration of the solubility product constants of hydrogen sulfide and ferrous sulfide that higher hydrogen ion concentrations are necessary to prevent ferrous sulfide precipitation when greater amounts of either hydrogen sulfide or dissolved iron salts or both are present.

To permit such treatment, a chemical tank 32 is located adjacent to the high pressure water line 9, preferably close to the water supply well W. Chemical or chemicals stored therein are pumped by pump 33 into the water distribution system through line and valve 34 at any pressure maintained therein without permitting air to enter the system.

From the water line 9 the water passes into the injection well N, and through the tubing 13 and on into the depleted oil sand. A packer or cement type seal 14 surrounds the tubing 13 at the top of the oil sand to localize the injection of water into the oil sands, to seal off said oil sands from extraneous air, and to avoid pressure and water loss to more pervious formations above the oil sands and infiltration of contaminating water from the above layers. The annular space above the packer may comprise a non-aqueous fluid seal to insure further against contact of the water with the oxygen of the air.

Oil, or a mixture of oil and water, is pumped to the surface from the oil well O by means of the pumping equipment shown. The oil well may be also produced in any other suitable manner.

It is evident from the foregoing description of the present invention that many modifications can be made without departing from the spirit of the invention. Thus, electric, centrifugal, or reciprocating pumps are applicable for the purpose, and may be driven by any type of power commonly employed in oil fields. Likewise, the water supply stratum may be located above the oil stratum or several water strata may be utilized as a water source.

In some cases, depending on the field waters, it is preferable to install separate chemical injecting stations at the head of each water-injection well instead of a central treating unit at the water-supply well head. Further, automatic pH controllers, such as are well known to the industry, or other similar devices, may be employed for regulating the addition of acid or other chemicals, and suitable metering devices and pressure controllers may be used if desired.

If desired booster pumps may be employed in the water distribution system, for instance, when the injection well is at a considerable distance from a water supply well.

Another advantage of the present system is that considerably less power input to the pumping system is necessary as the effective height to which the water need be raised is the difference in elevation between the water layer source and the point of injection in the case where the water source is below the injection point. It is obvious that the power input will be still less in the case where the water source is at an elevation above the point of injection into the oil sand.

We claim as our invention.

1. A flooding method comprising the steps of withdrawing water from a water-bearing stratum, forcing said water into an oil-bearing stratum through a closed system out of contact with the oxygen of the atmosphere, maintaining the pressure throughout said closed system at a value sufficiently high to prevent the escape of carbon dioxide dissolved in said water, and controlling the pH of said water by adding acid thereto during its passage from the water-bearing stratum to the oil-bearing strata.

2. A flooding method comprising the steps of withdrawing water from a water-bearing stratum, forcing said water into an oil-bearing stratum through a closed system out of contact with the oxygen of the atmosphere and maintaining the pressure throughout said closed system at a value higher than the natural pressure in the bottom of the supply well, said value being sufficiently high to prevent the escape of carbon dioxide dissolved in said water.

GLENVER McCONNELL.
HORACE VIVIAN STEADMAN.